Jan. 18, 1955  H. P. BECTON  2,699,670
METHOD OF PRODUCING CALIBRATED THERMOMETERS
Filed July 2, 1948  2 Sheets-Sheet 1
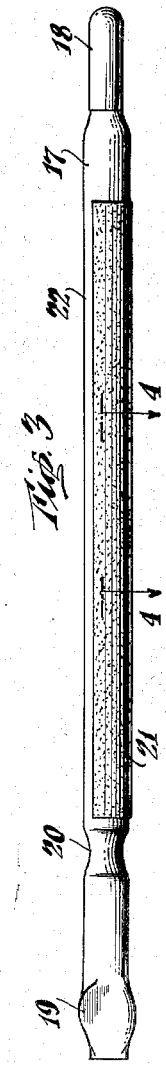
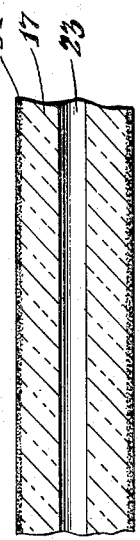
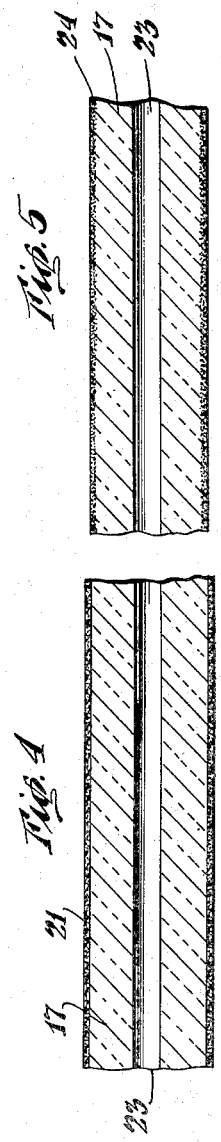
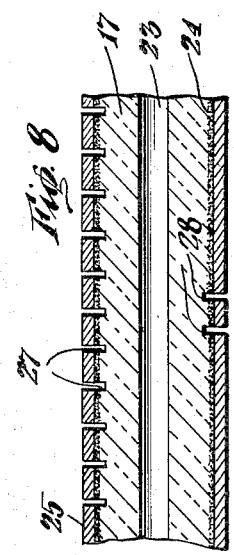
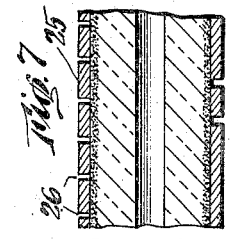
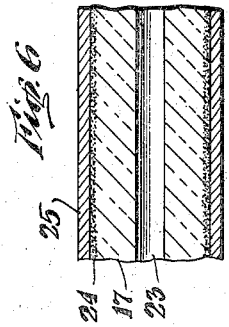
INVENTOR.
Henry P. Becton
BY
Duell and Kane
ATTORNEYS

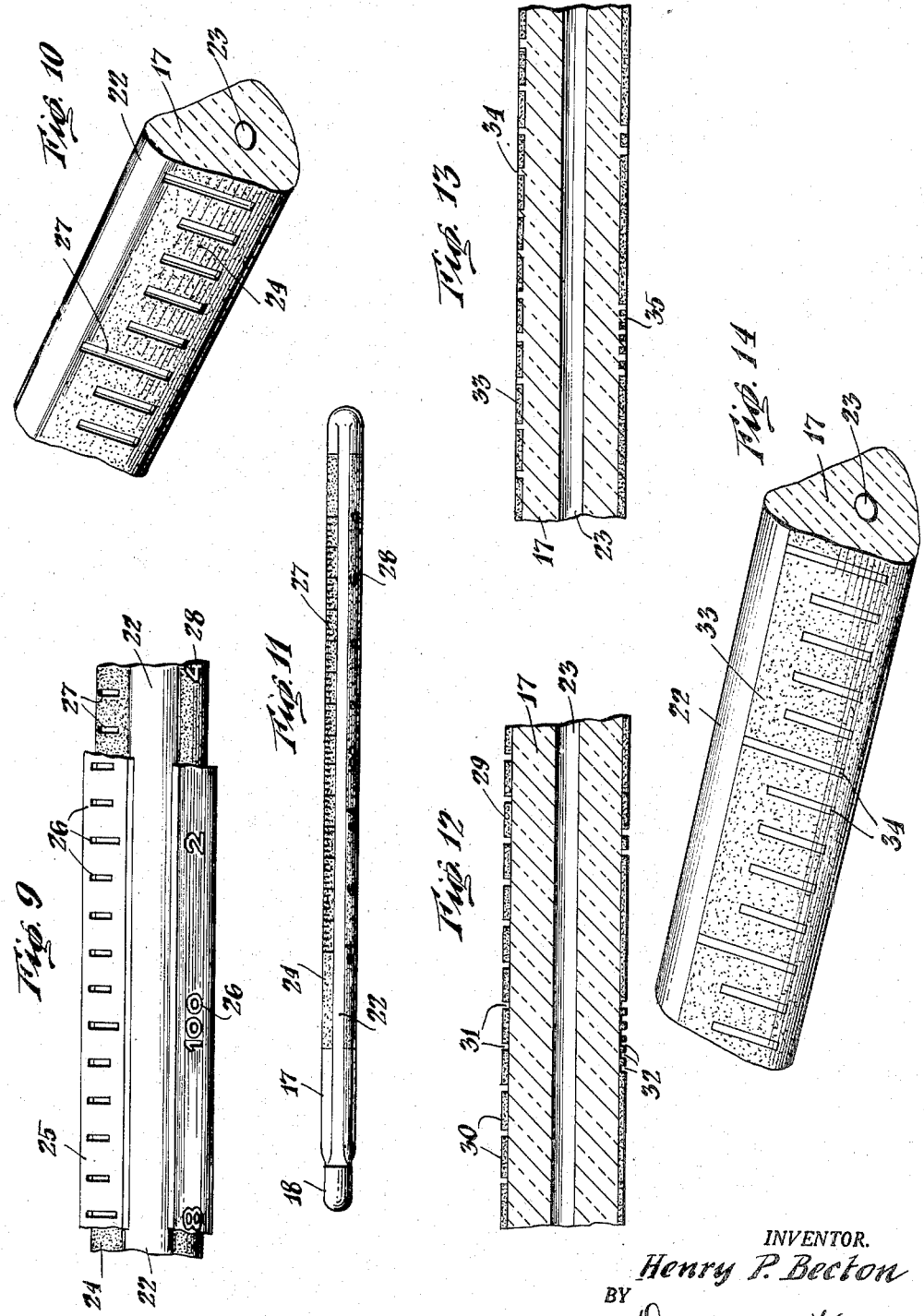

United States Patent Office 2,699,670
Patented Jan. 18, 1955

2,699,670

METHOD OF PRODUCING CALIBRATED THERMOMETERS

Henry P. Becton, Rutherford, N. J., assignor to Becton Dickinson and Company, Rutherford, N. J., a corporation of New Jersey Application July 2, 1948, Serial No. 36,604

3 Claims. (Cl. 73—1)

This invention relates to a method of calibrating and applying indicia to thermometers, especially of the clinical type and by means of which the tubing may be desirably stained to embody a tint or color and by means of which indicia may be associated with the thermometer tube.

Thermometers produced according to the inventive method may be subjected to any number of proper and accepted cleaning or sterilizing actions without fear that the indicia will eventually be rendered faint or undecipherable, thus destroying the further usefulness of the article.

With this object in mind, reference is had to the attached sheets of drawings illustrating practical embodiments of the invention and in which:

Fig. 1 is a fragmentary side elevation of a portion of glass tubing and showing the same subjected to an initial step in the method of manufacture;

Fig. 2 shows a partially completed thermometer subjected to the initial step of the present method;

Fig. 3 is a view similar to Fig. 1 but showing a second step of the method;

Fig. 4 is an enlarged fragmentary sectional view taken along the line 4—4 and in the direction of the arrows as indicated in Fig. 3;

Figs. 5 to 8 are views similar to Fig. 4 but illustrating successive steps of the method;

Fig. 9 is a fragmentary side elevation of a portion of a thermometer as shown in Fig. 8 but with certain of the coating broken away to disclose underlying structure;

Fig. 10 is a fragmentary perspective view of a portion of the finished thermometer;

Fig. 11 is a top view of the completed thermometer;

Figs. 12 and 13 are views similar to Figs. 4 to 8, but showing an alternative method of procedure; and Fig. 14 is a view similar to Fig. 10 but showing the thermometer resulting from the practice of a method as illustrated in Figs. 12 and 13.

By means of the present invention it is feasible to stain or color thermometers of—for example—the clinical type. Also, it will be practicable to associate with, or incorporate in such thermometers indicia of a substantially permanent and easily readable nature. As will be understood from an examination of the drawings, dimensions have been, in many instances, exaggerated to a material extent in order to emphasize the structural features which are involved; the present teachings involving substantially microscopic dimensions which would not ordinarily be apparent to the unaided eye.

Thus, in the method herein taught, a coating composition is applied to the surface of the glass articles to be stained. It is to be borne in mind that according to the preferred concept of the invention, the glass article is formed of a "non-hard" or lead glass and specifically a lead glass on the order of tubing as manufactured by the Corning Glass Works of Corning, New York. Glass of this type begins to warp when subjected to temperatures in excess of 700° F. The coating employed has, as its base, silver sulphide. This base may be dispersed in a lacquer or varnish, or in a so-called plastic coating liquid. Preferably, the varnish or other liquid will embrace 50% of the mixture while the remainder is provided by the silver sulphide. In most instances, however, the silver sulphide is mixed with oil, alcohol or water to provide a creamy paste. This paste is applied to the surface of the article to be tinted.

In order to produce a clinical thermometer, a suitable tube 15 as shown in Fig. 1 may be employed. To the outer surface of this tube a coating or paste has been applied throughout predetermined spaced zones as indicated at 16. Such application may be either by brushing, spraying, wiping, or in any other desired manner. In any event, a tube is thus furnished which may be subsequently subjected to steps, such that fever thermometers are produced therefrom. These thermometers will be characterized by stained body portions of major area and clear ends of relatively small area. The steps involved in the completion of a thermometer by the use of a tubing such as is shown in Fig. 1 will be apparent from a reading of the specification describing the preferred method of procedure to produce thermometers and which involves the individual coating of partially completed thermometers with the aforedescribed paste or composition.

This preferred procedure has been shown in its first form in Figs. 2 to 9 inclusive; the finished article being shown in Figs. 10 and 11. The second manner of proceeding with a partially formed thermometer has been shown in Figs. 12 and 13; the resultant article having been illustrated in Fig. 14.

Now considering Fig. 2 it will be noted that the numeral 17 indicates the body of a clinical thermometer provided with a mercury-bulb 18 of suitable configuration and a top chamber 19. The zone along which the latter is to be removed has been indicated by the reduced portion 20. As will be seen, the coating 21 has been applied substantially throughout the entire length of the body from a point just short of the outer end portion of the same to a point short of the lower or inner end thereof. This coating might obviously be applied to a greater or lesser extent than throughout the area shown.

After the coating has dried, or if desired, immediately after its application to the body 13, it is removed throughout a longitudinally extending zone or surface of the tube body. This removal as indicated at 22 in Fig. 3 should be in line with the lens area of the thermometer and be of ample width to permit of a viewing of the mercury column (not shown) underlying that lens area. Accordingly, the lens is uncoated or clear and is sharply defined by the adjacent edges of the coating on the remainder of the tube body.

Thus, as in Fig. 4, there exists a tube body 17 formed with a bore 23 and the outer surface of which tube is overlaid by a coating 21. This tube is then placed in an oven for a suitable interval of time. That interval may be approximately 12 hours at 700° F. Under certain conditions a lesser period of time and/or lower temperatures may be employed. It is to be remembered, however, that with the type of glass herein under consideration warping does not occur until temperatures substantially in excess of 700° are encountered. In any event, during the baking operation, a reaction occurs involving an exchange of silver ions within the paste or coating for sodium ions in the glass. This results in the surface of the glass article having embodied in it a substantially golden or amber tint. Depending upon the length of the baking, the temperature, etc. the shade of this tint will vary. This tinted layer has been shown at 24 in Fig. 5. It will be microscopically thin, but will actually comprise an integral part of the tube body 17 rather than being in the nature of a coating or layer overlying the same. For the purpose of avoiding confusion in this figure, no portions of the coating 21 which may remain after the baking operation have been illustrated; this residue having been removed in any desired manner.

Prior to the baking operation, or in fact, even before the application of the coating the thermometer may be "pointed." This may occur by subjecting the same to, for example, precise temperatures of 96° F. and 106° F. respectively and ascertaining the height to which the mercury or other column of material rises within the bore at these temperatures. After the removal of the thermometer from the oven, it is provided with a contraction or constriction. Also the top chamber 19 may be removed and the upper tube end sealed. These structures and techniques may embrace one of a number of proper methods of procedure. In view of the fact that they form no part of the present invention, they have not been illustrated, nor need they be described in detail. It suffices to say that the constriction or contraction will preferably be provided within an area of the thermometer tube which remains in unstained condition. This will be that portion of the tube body which intervenes the coated surface and the bulb end of the syringe as shown generally in Figs. 2 and 3. In any event, after these steps have been completed, a layer of wax or similar material 25 is applied to the thermometer as shown in Fig. 6.

The thermometer is now placed in an engraving machine, (not shown) and using the point marks for reference, a scale is applied which may register, for example, 94 to 108° F. Such application or engraving occurs by removing the wax coating 25 as indicated in Fig. 7 at the points identified at 26. The indicia embraced may include, for example, sub-division marks of degrees as well as the main marks, numerals in registry with certain or all of the main marks, serial number and identification of type of the thermometer, trade marks, etc. etc.

The thermometer is now etched. Such etching conveniently embraces the immersion of the thermometer in a bath of hydrofluoric acid. The opposite ends of the thermometer being covered with wax or a similar protective coating, which also covers the intervening portions of the lens and body thereof, it follows that the acid may only penetrate to the surface of the glass body at points at which the protective coating has been removed by the engraving or other steps. Therefore, only these zones will be etched. Accordingly, as shown in Fig. 8, the surface of the glass body 17 is actually penetrated to a microscopic extent at the points indicated at 27 and 28. Nevertheless such penetration will be adequate to insure a removal of the glass surface through the layer 24. Therefore, the indicia will appear as frosted, uncolored glass in the field of the stained surface. This has been clearly brought out in Fig. 9 in which the wax layer 25 applied over the stained surface 24 is shown as engraved at 26. The protective layer has been shown as removed throughout portions of this view so that the etched indicia at 27 and 28 is visible. As will also be apparent, the clear lens area 22 intervenes this indicia and the stained area 24 of the tube body.

After the completion of the etching step all of the wax is removed from the thermometer body. Such removal may be achieved by the use of a wax solvent or in any other suitable manner. In any event, a thermometer as shown in Figs. 10 and 11 results. To recapitulate and as shown in these views, that thermometer includes a body 17 of any desired cross-sectional contour and formed of lead or non-hard glass. Adjacent its opposite ends the body is preferably not stained. However, throughout the major portion of its length and certainly throughout the area of indicia application, it presents a stained surface 24. This stained surface continues preferably completely around the thermometer except through the zone overlying the lens area 22. To each side of this zone indicia is etched through the stained surface into the body of the tube to provide the graduations and the numerals interpretive of these graduations. No serial numbers or trade marks have been shown in these views, in that the matter in which they are provided will be readily apparent and to show them would merely serve to unnecessarily confuse the illustrations.

Considering the method somewhat diagrammatically illustrated in Figs. 12 and 13, it is to be understood that, as aforebrought out, a fever thermometer is to be produced. After "pointing" and as in Fig. 12 the body 17 of the tube receives a coating 30 of paste or similar material as aforedescribed. This coating is continued from a point adjacent the lower to a point adjacent the upper end of the tube. Extending beyond the latter is a top chamber, (not shown). After the coating has dried, then the tube area overlying the lens is wiped, in order that no paste or similar material will coat this portion of the tube. As is apparent, if wiping or a similar operation is not to be resorted to, then at the time of application of the coating, the lens area may be masked if desired. In any event, the thermometer is placed in an engraving or similar indicia providing machine. In that machine the coating 30 is removed along pre-determined areas as indicated by the reference numerals 31 and 32. These areas as aforebrought out, will provide the desired indicia, including the graduation numerals, serial numbers, etc. etc.

The engraved tube is now placed in the oven and subjected to a proper temperature for a suitable period of time. Accordingly, an exchange of silver ions within the paste or solution occurs for sodium ions in the glass. This results in the desired surface tint being embodied in the latter. This has been indicated by the reference numerals 33 in Fig. 13. The areas 31 and 32 as in Fig. 12 being uncoated, it follows that within those areas no stain will be embodied in the glass surface. Therefore, these areas indicated by the numerals 34 and 35 in Fig. 13 will be clear. In other words, they will contrast from the stained area by assuming the color or lack of color of the glass body 17.

Consequently, as in Fig. 14, a thermometer results which includes a body of desired configuration and the lens area of which is clear and unobstructed. However, to both sides of this area the surface of the body is tinted or stained as indicated at 33. Within this stained or colored zone, indicia is provided by unstained areas shown at 34, in this figure. It will, of course, be understood that after the baking operation any residue of the coating may be removed by any suitable cleaning process.

As will be understood with respect to the tubing shown in Fig. 1, the first method described may be followed. In other words, the coated lens areas may be wiped. Thereupon—according to technique described—the tubing may be baked to stain the surface thereof. At that time, or prior thereto, the tubing may be divided into sections of suitable length. The procedure thereafter may involve the steps of partially completing the thermometers, applying wax or similar material thereto, engraving, the wax, etching, etc.

I claim:

1. A method of providing a colored stain extending from the surface of an uncolored glass thermometer tube depthwise into the body of such tube to furnish in contrast with the tube body and indicia outline, said method including employing a tube furnished with a bulb at one end, a top chamber at the opposite end, a bore providing communication between said bulb and chamber and a thermally responsive agent movable through said bore, applying a proper metallic salt coating to the surface of such tube in a manner such that indicia may be defined thereby, establishing temperature calibration points for said tube adjacent the area of said coating, in subjecting the assembly to the action of sufficiently high temperatures to effect an ion exchange between the surface and the adjacent metallic salt layer and in simultaneously expanding the thermally responsive agent to fill the bulb, bore and part of the top chamber of the tube, limiting the temperature to prevent such agent from expanding beyond the capacity of such top chamber and to prevent warping of the tube, continuing the subjecting of the assembly to a temperature such that the ion exchange will stain the tube from its surface depthwise into its body to a point short of its bore, thereupon cooling the assembly, forcing the thermally responsive agent into position solely within said bore and said bulb, removing the top chamber and sealing the adjacent tube end.

2. A method of providing a colored stain extending from the surface of an uncolored glass thermometer tube depthwise into the body of such tube to furnish in contrast with the tube body an indicia outline, said method including employing a tube furnished with a bulb at one end, a top chamber at the opposite end, a bore providing communication between said bulb and chamber and a thermally responsive agent movable through said bore, applying a proper metallic salt coating to the surface of such tube in a manner such that indicia may be defined thereby, establishing temperature calibration points for said tube adjacent the area of said coating, in subjecting the assembly to the action of sufficiently high temperatures to effect an ion exchange between the tube surface and the adjacent metallic salt layer and in simultaneously expanding the thermally responsive agent to fill the bulb, bore and part of the top chamber of the tube, limiting the temperature to prevent such agent from expanding beyond the capacity of such top chamber and to prevent warping of the tube, continuing the subjecting of the assembly to a temperature such that the ion exchange will stain the tube from its surface depthwise into its body to a point short of its bore, thereupon cooling the assembly, forcing the thermally responsive agent into position solely within said bore and said bulb, removing the top chamber, sealing the adjacent tube end and etching temperature indicia through the stained surface of the tube face calibration points.

3. A method of providing a colored stain extending from the surface of an uncolored glass thermometer tube depthwise into the body of such tube to furnish in contrast with the tube body an indicia outline, said method including employing a tube furnished with a bulb at one end, a top chamber at the opposite end, a bore providing communication between said bulb and chamber and a thermally responsive agent movable through said bore, applying a proper metallic salt coating to the surface of such tube in a manner such that indicia may be defined thereby, establishing temperature calibration points for said tube adjacent the area of said coating, removing the coating at zones intermediate such points with such removal being in the form of indicia, in subjecting the assembly to the action of sufficiently high temperatures to effect an ion exchange between the tube surface and the adjacent metallic salt layer and in simultaneously expanding the thermally responsive agent to fill the bulb, bore and part of the top chamber of the tube, limiting the temperature to prevent such agent from expanding beyond the capacity of such top chamber and to prevent warping of the tube, continuing the subjecting of the assembly to a temperature such that the ion exchange will stain the tube from its surface depthwise into its body to a point short of its bore, thereupon cooling the assembly, forcing the thermally responsive agent into position solely within said bore and said bulb, removing the top chamber and sealing the adjacent tube end.

References Cited in the file of this patent

UNITED STATES PATENTS

| Number | Name | Date |
|---|---|---|
| 460,013 | Hicks et al. | Sept. 22, 1891 |
| 1,059,857 | Frankenberg | Apr. 22, 1913 |
| 1,321,743 | Hillenbrand | Nov. 11, 1919 |
| 1,405,231 | Krigel | Jan. 31, 1922 |
| 1,990,922 | Thiemann | Feb. 12, 1935 |
| 2,010,589 | Greiner, Jr. | Aug. 6, 1935 |

FOREIGN PATENTS

| | | |
|---|---|---|
| 9,250 | Great Britain (1890) | Apr. 18, 1891 |

OTHER REFERENCES

Weyl: "Coloured Glasses," Journal of the Society of Glass Technology, vol. XXIX, No. 135, October 1945, pp. 365, 366, 367, 374 and 375; available in Scientific Library.